US007007116B2

(12) United States Patent
Odakura et al.

(10) Patent No.: US 7,007,116 B2
(45) Date of Patent: Feb. 28, 2006

(54) ELECTRONIC APPARATUS AND STARTUP CONTROL METHOD OF STORAGE DEVICE

(75) Inventors: Yasuhiro Odakura, Tama (JP); Koichi Kobayashi, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 10/668,225

(22) Filed: Sep. 24, 2003

(65) Prior Publication Data

US 2004/0064607 A1    Apr. 1, 2004

(30) Foreign Application Priority Data

Sep. 27, 2002    (JP)    ............... 2002-284499

(51) Int. Cl.
G06F 13/00    (2006.01)

(52) U.S. Cl. .............. 710/52; 710/60; 710/33; 710/25; 710/74; 370/232

(58) Field of Classification Search ............ 710/52–57, 710/58–60, 25, 33–35, 72–74; 360/46, 53, 360/75; 711/202, 218; 370/232–234
See application file for complete search history.

(56) References Cited

U.S. PATENT DOCUMENTS

| 5,121,479 | A | * | 6/1992 | O'Brien ..................... 710/34 |
| 5,450,546 | A | * | 9/1995 | Krakirian ................... 710/57 |
| 5,729,708 | A | * | 3/1998 | Satoh et al. ................ 710/52 |
| 5,884,099 | A | * | 3/1999 | Klingelhofer ............... 710/52 |
| 5,944,802 | A | * | 8/1999 | Bello et al. ................. 710/52 |
| 6,289,464 | B1 |  | 9/2001 | Wecker et al. |
| 6,516,359 | B1 | * | 2/2003 | Kurihara et al. ............. 710/52 |
| 2002/0045961 | A1 |  | 4/2002 | Gibbs |
| 2003/0083012 | A1 |  | 5/2003 | Iwasaki |

FOREIGN PATENT DOCUMENTS

| JP | 08-194583 | 7/1996 |
| JP | 08-212015 | 8/1996 |
| JP | 2000-311064 | 11/2000 |
| JP | 2001-014107 | 1/2001 |
| JP | 2003-143052 | 5/2003 |

OTHER PUBLICATIONS

Notification of Reasons for Rejection.
"Reduce Low-End DASD Power by adding Non-Volatile Memory Buffer," IBM Technical Disclosure Bulletin, IBM Corp. New York, US, p. 131; XP000581647, vol. 39, No. 3, Mar. 1, 1996.
European Search Report issued by European Patent Office in Application No. 03020772 on Dec. 8, 2004.

* cited by examiner

Primary Examiner—Christopher Shin
(74) Attorney, Agent, or Firm—Finnegan, Henderson, Farabow, Garrett & Dunner, L.L.P.

(57) ABSTRACT

Data received by a Bluetooth wireless unit is buffered on a DRAM. At this time, a CPU (which operates on the basis of a description of HDD startup control program calculates the data transfer rate of the Bluetooth wireless unit and the free area size of a buffer area on the DRAM, and also calculates the remaining time until the buffer data on the DRAM becomes full of data, on the basis of these values. When the calculated remaining time has reached a required startup time of an HDD indicated by remaining time determination data A stored in a flash memory, the CPU starts up the HDD.

8 Claims, 7 Drawing Sheets

ELECTRONIC APPARATUS AND STARTUP CONTROL METHOD OF STORAGE DEVICE

CROSS-REFERENCE TO RELATED APPLICATIONS

This application is based upon and claims the benefit of priority from the prior Japanese Patent Application No. 2002-284499, filed Sep. 27, 2002, the entire contents of which are incorporated herein by reference.

BACKGROUND OF THE INVENTION

1. Field of the Invention

The present invention relates to a startup control technique of a storage device in an electronic apparatus which comprises a communication function, and can be driven by, e.g., a battery.

2. Description of the Related Art

In recent years, portable electronic apparatuses such as personal digital assistants (PDAs), which can be powered by batteries, have prevailed. Most such electronic apparatuses have a wireless communication function. Upon receiving data using this wireless communication function, the received data is buffered in a random access memory (RAM), and is saved on a magnetic disk accordingly when the load on the CPU is low.

In an electronic apparatus which operates on power from a battery, various methods for saving power have been devised to assure the longest possible operating time. For example, Japanese Patent Application No. 2001-333055 discloses the following technique in place of the conventional method for saving received data, which is buffered in a RAM, on a magnetic disk accordingly when the load on the CPU is low. That is, the saving process is delayed until the RAM is full of data, and the received data is saved in a single operation at the time when the RAM becomes full of data, thus achieving power saving for a magnetic disk device (to be referred to as an HDD hereinafter) used to write data on a magnetic disk. Therefore, by applying this technique, the HDD is started up only when data is saved on the HDD, i.e., only when necessary. Hence, not only power consumption required to make a write access to the HDD can be saved but also further power savings can be achieved.

It should be noted that the HDD requires a relatively long time until it is started up. Therefore, when such power savings are to be achieved, if the HDD is started up during data reception of the wireless communication function, the data reception must be suspended from when the RAM is full of data until the HDD is started up.

BRIEF SUMMARY OF THE INVENTION

According to an aspect of the invention provides an electronic apparatus comprising a communication device, a first storage device which buffers received data of the communication device, a second storage device which stores the received data buffered in the first storage device, a calculation unit configured to calculate a remaining time until the first storage device becomes full of data, on the basis of a data transfer rate of the communication device and a free capacity of the first storage device, and a control unit configured to start up the second storage device when the remaining time calculated by the calculation unit reaches a predetermined time.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described hereinafter with reference to the accompanying drawings.

First Embodiment

The first embodiment of the present invention will now be described.

Figure 1:
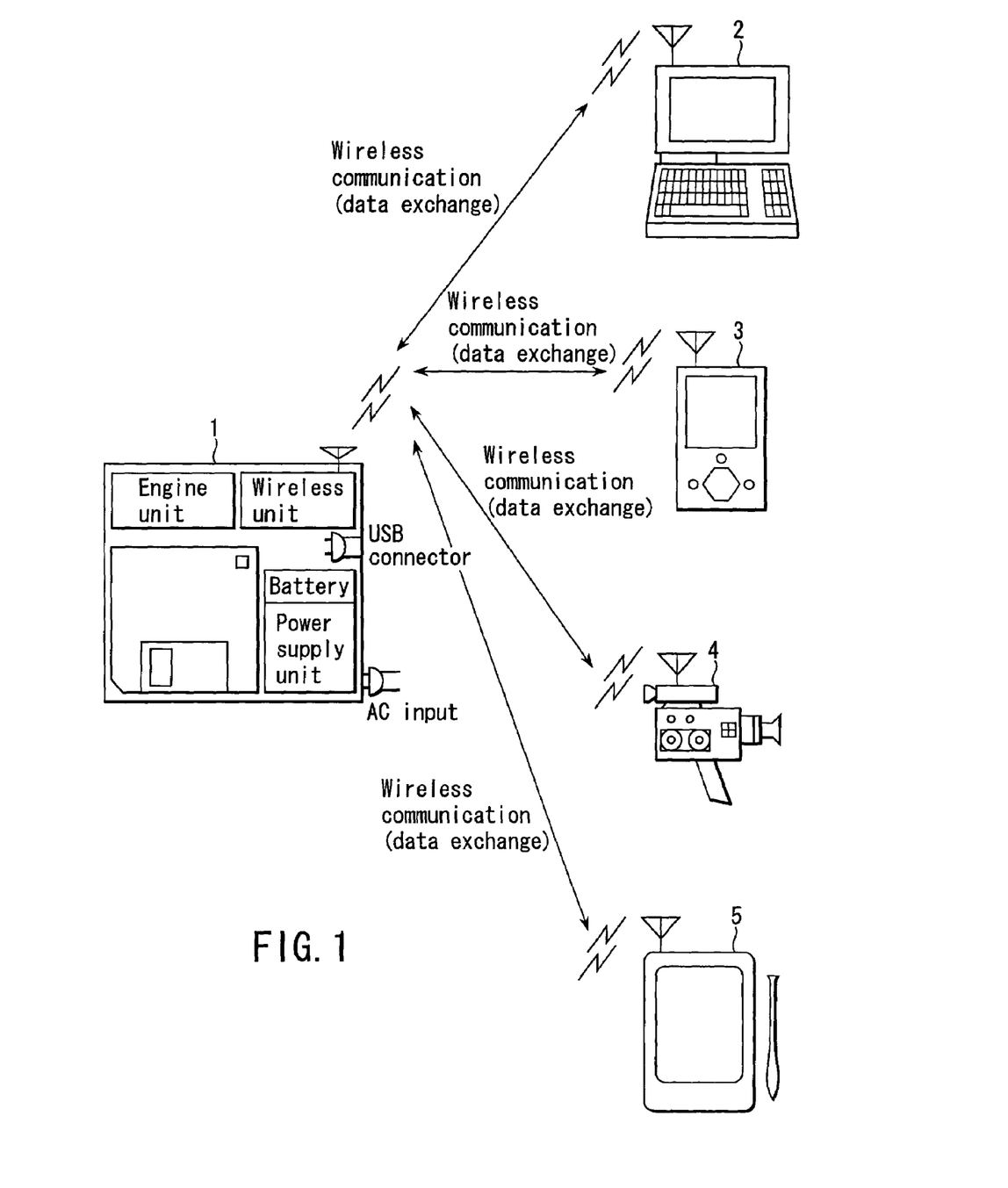
FIG. 1 is a view for explaining a use environment of an electronic apparatus according to a first embodiment of the present invention.

FIG. 1 is a view for explaining the use environment of an electronic apparatus according to an embodiment of the present invention.

As shown in FIG. 1, an electronic apparatus 1 of this embodiment is a storage device which incorporates a battery and has a wireless communication function. The storage device effects wireless communication with such information apparatuses as a personal computer 2, portable game machine 3, digital video camera 4, and PDA 5. This electronic apparatus 1 and information apparatuses 2 to 5 comprise Bluetooth modules, and effect wireless data communication via those Bluetooth modules.

The maximum wireless communication range of the Bluetooth modules is about 100 m. When the electronic apparatus 1 and information apparatuses 2 to 5 approach each other within this range, a Bluetooth link is automatically established to allow data exchange.

The electronic apparatus 1 also has a USB connector that receives a USB cable, and comprises a wired communication function that effects wired data communication via this USB connector.

Figure 2:
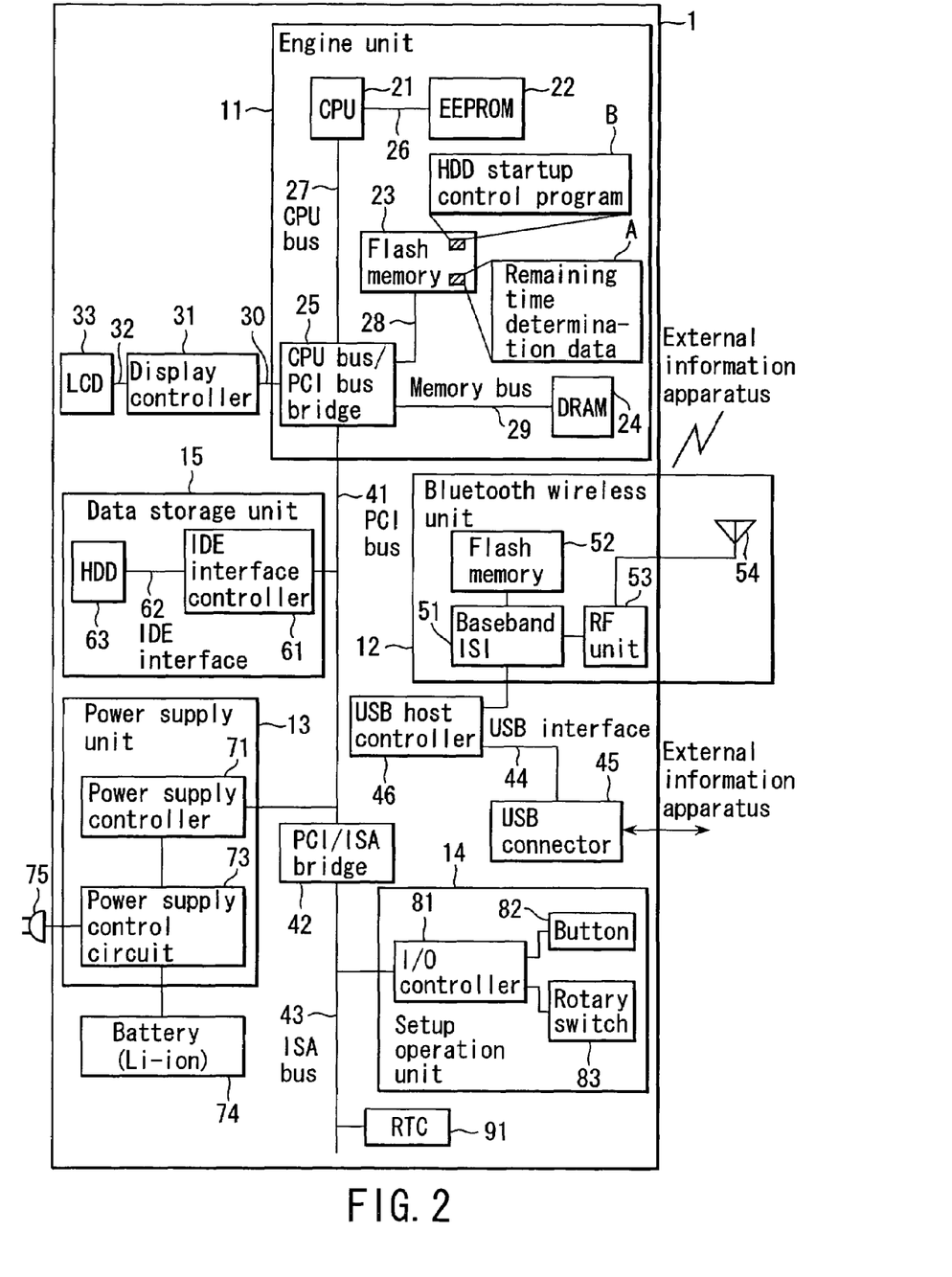
FIG. 2 is a block diagram showing the arrangement of the electronic apparatus according to the first embodiment.

FIG. 2 is a block diagram showing the arrangement of this electronic apparatus 1.

As shown in FIG. 2, this electronic apparatus 1 has an engine unit 11, Bluetooth wireless unit 12, power supply unit 13, setup operation unit 14, and data storage unit 15.

The engine unit 11 controls the overall electronic apparatus 1. A CPU 21 as a core of this engine unit 11 is connected to an EEPROM 22 via a bus 26. The EEPROM 22 stores various kinds of control information.

The CPU 21 is connected to a CPU bus/PCI bus bridge 25 via a CPU bus 27. A flash memory 23 is connected to the CPU bus/PCI bus bridge 25 via a memory bus 28, and a DRAM 24 is also connected to it via a memory bus 29.

The flash memory 23 stores remaining time determination data A (to be described later) and various programs which include HDD startup control program B (to be described later). On the other hand, the DRAM 24 is used as a work memory of the CPU 21. Also, the DRAM 24 is used as a buffer area of the data storage unit 15.

The CPU bus/PCI bus bridge 25 is an interface bridge between the CPU bus 27 and a PCI bus 41, and is connected to a display controller 31 via a bus 30. The display controller 31 executes display control of a LCD 33 which is connected to it via a bus 32.

The PCI bus 41 is connected to an ISA bus 43 via a PCI/ISA bridge 42. The PCI bus 41 is connected to the Bluetooth wireless unit 12 and a USB interface 44 via a USB host controller 46. A USB connector 45 used to connect an information apparatus via a cable is connected to the USB interface 44.

The Bluetooth wireless unit 12 comprises a baseband LSI 51, flash memory 52, antenna 54, and RF unit 53. The baseband LSI 51 is connected to the USB host controller 46, and controls a Bluetooth wireless function. The flash memory 52 stores a program to be executed by the baseband LSI 51. The RF unit 53 controls an RF signal between the baseband LSI 51 and antenna 54.

The data storage unit 15 is connected to the PCI bus 41. The data storage unit 15 has an IDE interface controller 61 and an HDD 63. The IDE interface controller 61 is connected via the PCI bus 41. The HDD 63 is connected to the IDE interface controller 61 via an IDE interface 62. The electronic apparatus 1 of this embodiment is characterized by controlling to start up this HDD 63 at an appropriate time, and such characteristic feature will be explained later.

Furthermore, the power supply unit 13 is connected to the PCI bus 41. The power supply unit 13 comprises a power supply controller 71 and a power supply control circuit 73. The power supply controller 71 is connected to the PCI bus 41. The power supply control circuit 73 is connected to the power supply controller 71. A battery 74 and AC input 75 are connected to the power supply control circuit 73. When this electronic apparatus 1 is used in a mobile environment, the battery 74 supplies electric power. When the battery 74 is charged or when the electronic apparatus 1 is used in an environment in which the apparatus can be AC-driven, the AC input 75 supplies electric power. Electric power from the battery 74 or AC input 75 is supplied to components required to operate the electronic apparatus 1, e.g., the engine unit 11, wireless unit 12, data storage unit 15, and the like.

The setup operation unit 14 is connected to the ISA bus 43. The setup operation unit 14 includes an I/O controller 81, and a button 82 and rotary switch 83. The I/O controller 81 is connected to the ISA bus 43. The button 82 and rotary switch 83 are connected to the I/O controller 81. The button 82 and rotary switch 83 are used to set up the operation environment of the electronic apparatus 1 and to start up the apparatus.

Furthermore, a real-time clock (RTC) 91 is connected to the ISA bus 43. The RTC 91 is a timing module which operates by its own built-in battery, and measures the system time using a plurality of registers.

Figure 3:
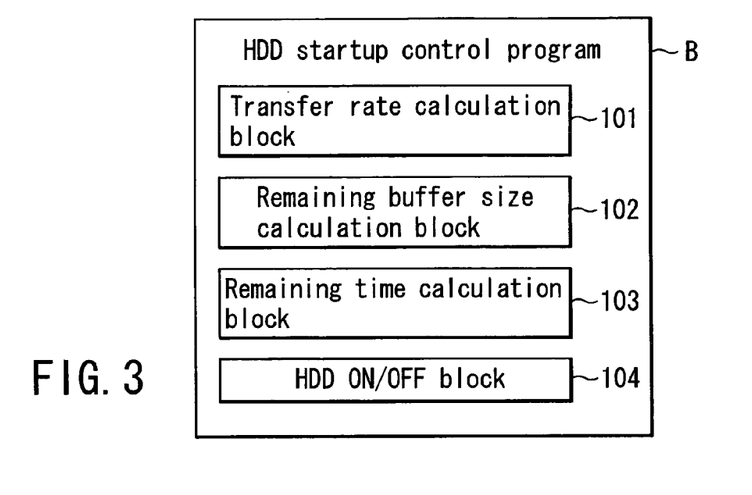
FIG. 3 is a diagram showing functional blocks of an HDD startup control program according to the first embodiment of the present invention.

The operation principle of startup control of the HDD 63, which is executed by HDD startup control program B mentioned above, will be described below. FIG. 3 is a block diagram showing functional blocks of this HDD startup control program B.

As shown in FIG. 3, HDD startup control program B has respective processing blocks, i.e., a transfer rate calculation block 101, remaining buffer size calculation block 102, remaining time calculation block 103, and HDD ON/OFF block 104.

The transfer rate calculation block 101 calculates the data transfer rate of data reception which is made by the Bluetooth wireless unit 12. During wireless data communication, since the data transfer rate changes largely depending on the circumstances at that time, the transfer rate calculation block 101 calculates an actual data transfer rate. The transfer rate calculation block 101 acquires the reception times of respective packets from the RTC 91 during data reception of the Bluetooth wireless unit 12. The block 101 calculates a time required to transfer one packet on the basis of the difference between the reception times of the current and previous packets. The block 101 then divides the data size per packet by the calculated required time, thus instantaneously calculating a data transfer rate at that time.

The remaining buffer size calculation block 102 instantaneously calculates the latest buffer remaining size of the buffer area of the data storage unit 15, which is assured in the DRAM 24, by subtracting the data size per packet every time the Bluetooth wireless unit 12 receives data.

The remaining time calculation block 103 calculates the remaining time until the buffer area of the data storage unit 15, which is assured in the DRAM 24, becomes full of data, on the basis of the data transfer rate calculated by the transfer rate calculation block 101 and the buffer remaining size calculated by the remaining buffer size calculation block 102. More specifically, the block 103 divides the remaining buffer size by the data transfer rate.

The HDD ON/OFF block 104 compares the remaining time calculated by the remaining time calculation block 103 with remaining time determination data A stored in the flash memory 23, and executes startup control of the HDD 63 in accordance with the comparison result. As this remaining time determination data A, a value which is defined in advance as a time required to start up the HDD 63 is set. The HDD ON/OFF block 104 starts the startup control of the HDD 63 when the remaining time until the buffer area of the data storage unit 15, which is assured in the DRAM 24, becomes full of data has reached the time required to start up the HDD 63. In this way, since the startup control of the HDD 63 is completed at nearly the same time that the buffer area of the data storage unit 15, which is assured in the DRAM 24, becomes full of data, received data buffered in the DRAM 24 can be saved on the HDD 63 without any delay, and data reception by the Bluetooth wireless unit 12 is never suspended.

The HDD ON/OFF block 104 stops the started HDD 63 immediately after received data buffered in the DRAM 24 has been saved on the HDD 63. At this time, the remaining buffer size calculation block 102 resets the buffer remaining size of the data storage unit 15, which is assured in the DRAM 24, to an initial value.

Figure 4:
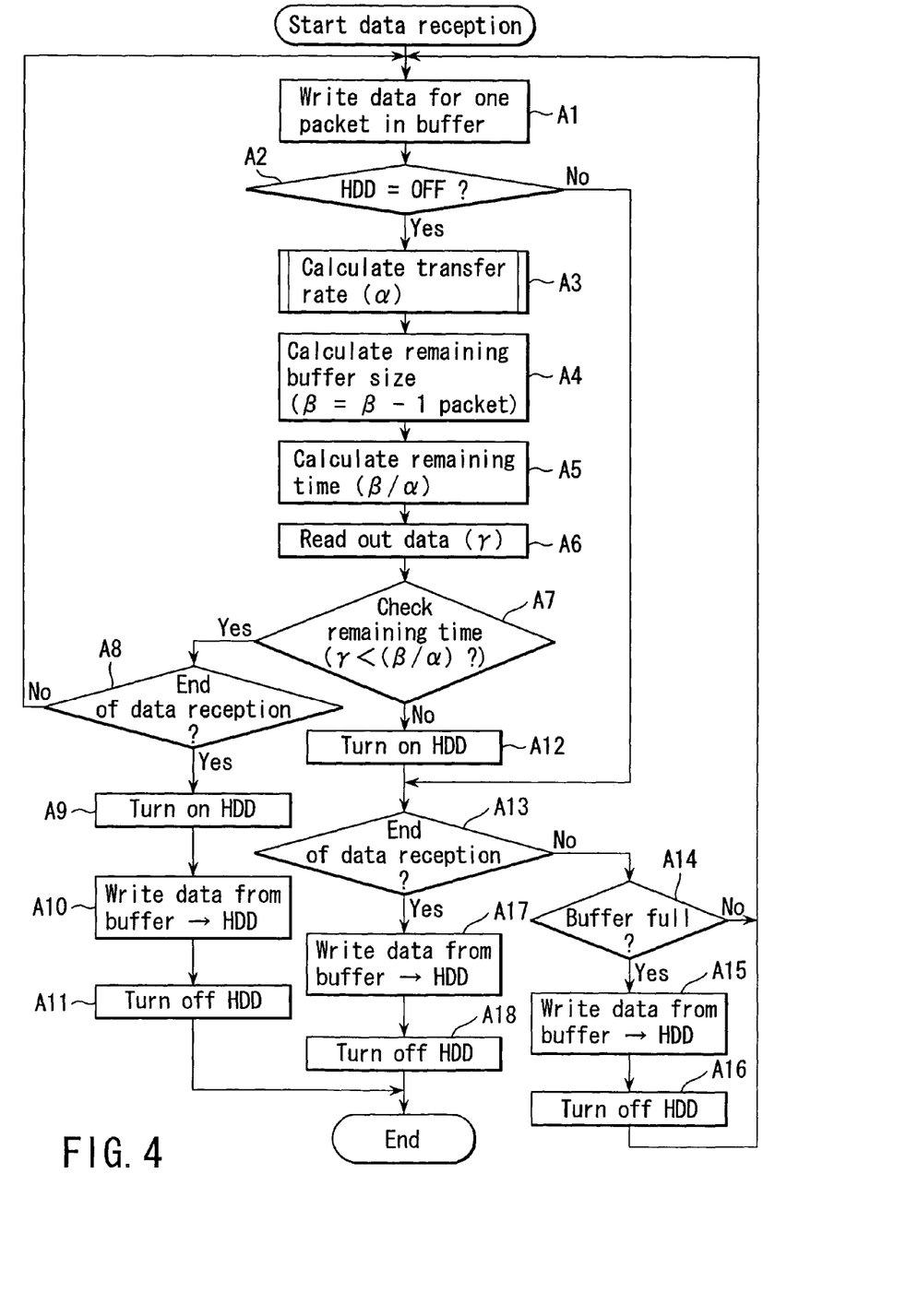
FIG. 4 is a first flowchart showing the operation sequence of HDD startup control to be executed by the HDD startup control program according to the first embodiment of the present invention.
Figure 5:
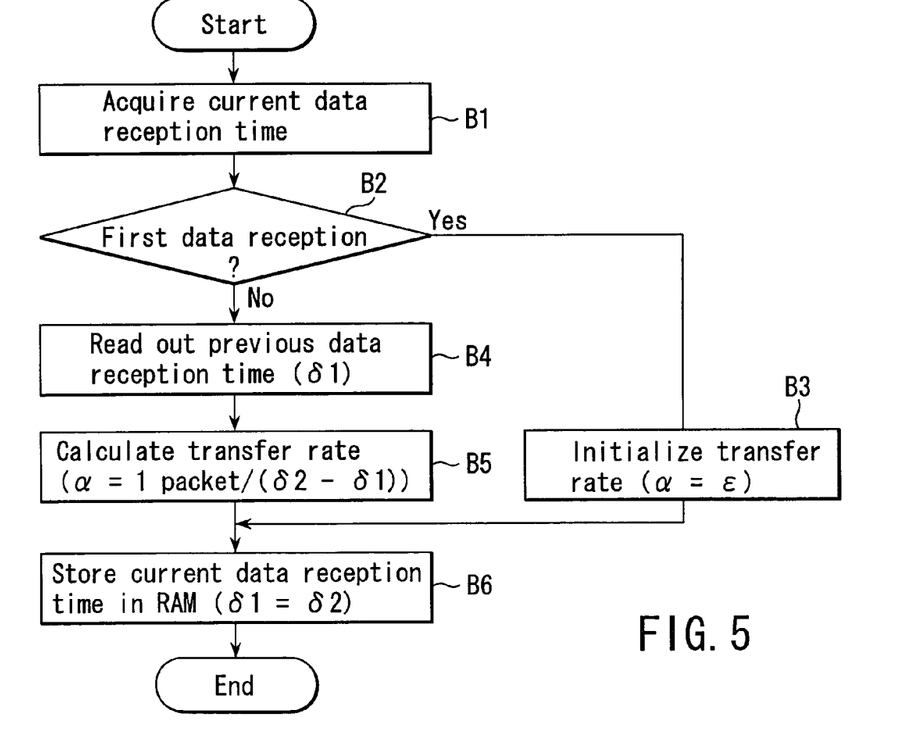
FIG. 5 is a second flowchart showing the operation sequence of HDD startup control to be executed by the HDD startup control program according to the first embodiment of the present invention.

FIGS. 4 and 5 are flowcharts showing the operation sequence of the startup control of the HDD 63, which is executed by HDD startup control program B.

If data is written in the buffer area in the DRAM 24 (step A1 in FIG. 4), HDD startup control program B checks if the HDD 63 is OFF (step A2 in FIG. 4). If the HDD 63 is OFF (YES in step A2 in FIG. 4), HDD startup control program B calculates the data transfer rate of data reception by the Bluetooth wireless unit 12 (step A3 in FIG. 4). FIG. 5 is a flowchart showing the operation sequence of this data transfer rate calculation.

HDD startup control program B acquires the current data reception time from the RTC 91 (step B1 in FIG. 5). Program B checks if this data reception is the first one (step B2 in FIG. 5). If this data reception is the first one (YES in step B2 in FIG. 5), program B sets a data transfer rate which is defined in advance (step B3 in FIG. 5). This data transfer rate is acquired from remaining time determination data A stored in the flash memory 23. HDD startup control program B stores the data reception time acquired in step B1 in FIG. 5 in the DRAM 24 (step B6 in FIG. 5).

On the other hand, if this data reception is not the first one (NO in step B2 in FIG. 5), HDD startup control program B reads out the previous data reception time from the DRAM 24 (step B4 in FIG. 5), and calculates a data transfer rate on the basis of the current and previous data reception times and data size per packet (step B5 in FIG. 5). After the data transfer rate is calculated, HDD startup control program B stores the data reception time acquired in step B1 in FIG. 5 in the DRAM 24 (step B6 in FIG. 5).

When the data transfer rate is calculated in such sequence, HDD startup control program B then calculates the remaining buffer size of the data storage unit 15, which is assured in the DRAM 24 (step A4 in FIG. 4). Furthermore, program B calculates the remaining time until buffer full on the basis of this remaining buffer size and data transfer rate (step A5 in FIG. 4). HDD startup control program B reads out remaining time determination data A from the flash memory 23 (step A6 in FIG. 4), and checks if the calculated remaining time until buffer full is longer than a time indicated by remaining time determination data A (step A7 in FIG. 4).

If the calculated remaining time is longer than the time indicated by remaining time determination data A (YES in step A7 in FIG. 4), HDD startup control program B checks if data reception is complete (step A8 in FIG. 4). If data reception is complete (YES in step A8 in FIG. 4), program B starts up the HDD 63 (step A9 in FIG. 4), saves received data from the DRAM 24 onto the HDD 63 (step A10 in FIG. 4), and then stops the HDD 63 (step A11 in FIG. 4), thus ending this process. On the other hand, if data reception is not complete (NO in step A8 in FIG. 4), program B repeats the processes from step A1 in FIG. 4.

On the other hand, if the calculated remaining time is shorter than the time indicated by remaining time determination data A (NO in step A7 in FIG. 4), HDD startup control program B starts up the HDD 63 (step A12 in FIG. 4). Also, HDD startup control program B checks if data reception is complete (step A13 in FIG. 4). If data reception is not complete (NO in step A13 in FIG. 4), program B then checks if the buffer is full (step 14 in FIG. 4). If the buffer is full (YES in step A14 in FIG. 4), HDD startup control program B saves received data from the DRAM 24 onto the HDD 63 (step A15 in FIG. 4), and then stops the HDD 63 (step A16 in FIG. 4), thus repeating the above processes from step A1 in FIG. 4. Also, if the buffer is not full (NO in step A14 in FIG. 4), the processes from step A1 in FIG. 4 are repeated.

On the other hand, if data reception is complete (YES in step A13 in FIG. 4), HDD startup control program B saves received data from the DRAM 24 onto the HDD 63 (step A17 in FIG. 4), then stops the HDD 63 (step A18 in FIG. 4), thus ending this process.

Furthermore, if the HDD 63 is ON (NO in step A2 in FIG. 4), HDD startup control program B executes the aforementioned processes from step A9 in FIG. 4.

As described above, in the electronic apparatus 1 of this embodiment, the HDD 63 undergoes the startup control so that the startup control of the HDD 63 is completed at nearly the same time that the buffer area of the DRAM 24 that buffers received data becomes full of data, thus achieving further power savings while avoiding data reception from being interrupted.

Second Embodiment

The second embodiment of the present invention will be described below.

Figure 6:
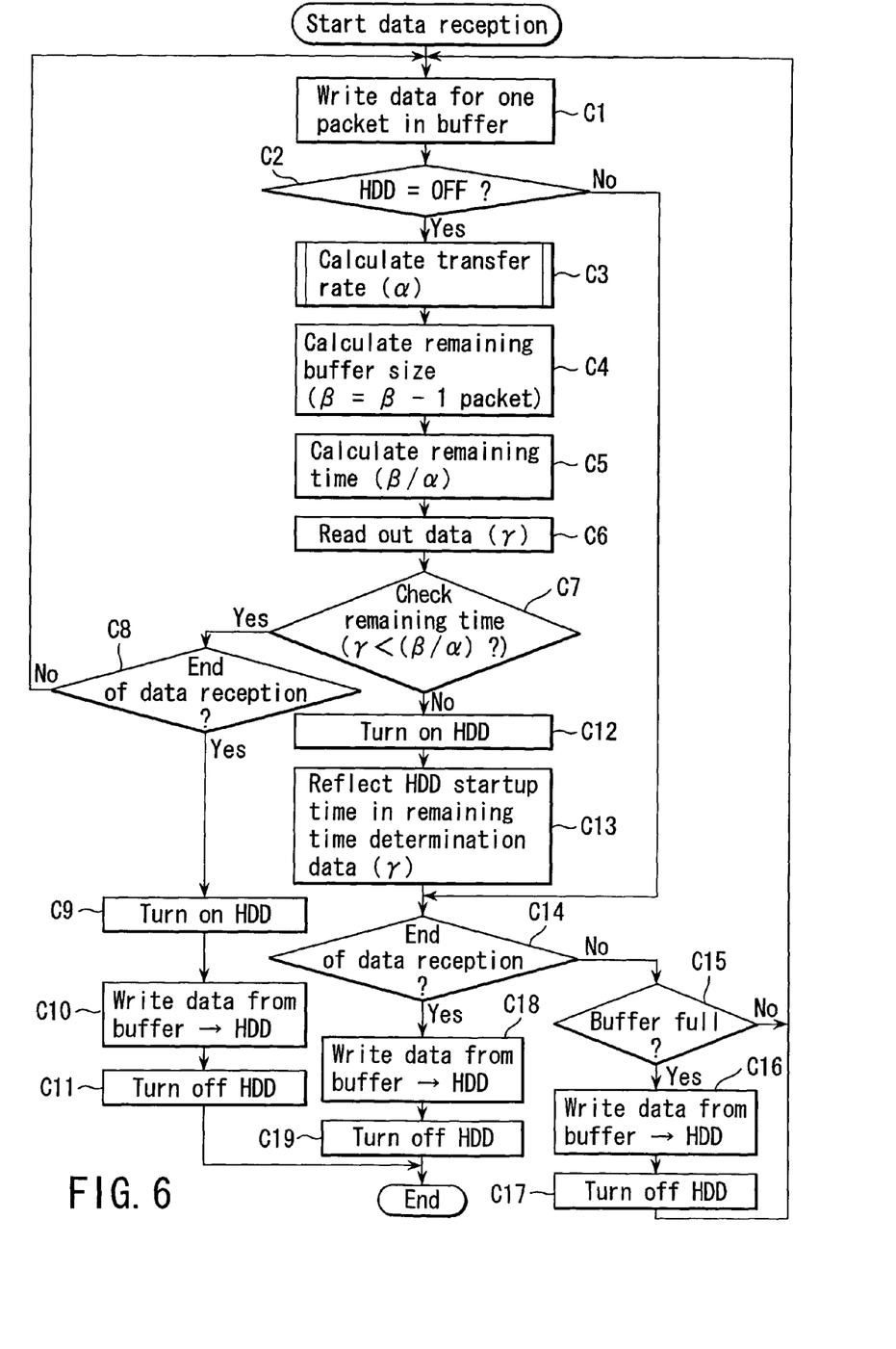
FIG. 6 is a flowchart showing the operation sequence of HDD startup control to be executed by the HDD startup control program according to a second embodiment of the present invention.

FIG. 6 is a flowchart showing the operation sequence of the startup control of the HDD 63, which is executed by HDD startup control program B of the second embodiment.

The difference between the aforementioned first embodiment and this second embodiment lies in that an actual time required to start up the HDD 63 is used as the startup time of the HDD 63 in place of the time which is defined in advance by remaining time determination data A in the flash memory 23. That is, a process for reflecting the startup time of the HDD 63 in remaining time determination data A in the flash memory 23 (step C13 in FIG. 6) is added between steps A12 (corresponding to step C12 in FIG. 6) and A13 corresponding to step C14 in FIG. 6) in FIG. 4.

In this way, even when the time required to start up the HDD 63 is prolonged due to aging of the HDD 63, the HDD 63 undergoes the startup control so that the startup control of the HDD 63 is completed at nearly the same time that the buffer area of the DRAM 24 that buffers received data becomes full of data.

Third Embodiment

The third embodiment of the present invention will be described below.

In the first and second embodiments above, the startup control of the HDD 63 upon data reception has been explained. The third embodiment will explain startup control of the HDD 63 upon data transmission.

When data stored in the HDD 63 is transmitted by the Bluetooth wireless unit 12, the transmission data is read out together from the HDD 63 and is buffered in the DRAM 24 until it is transmitted from the Bluetooth wireless unit 12. Hence, HDD startup control program B of the third embodiment stops the HDD 63 immediately after transmission data is buffered from the HDD 63 in the DRAM 24. When more transmission data must be read from the HDD 63, program B executes the startup control of the HDD 63 so that the startup control of the HDD 63 is completed at nearly the same time that all buffered transmission data has been transmitted.

Figure 7:
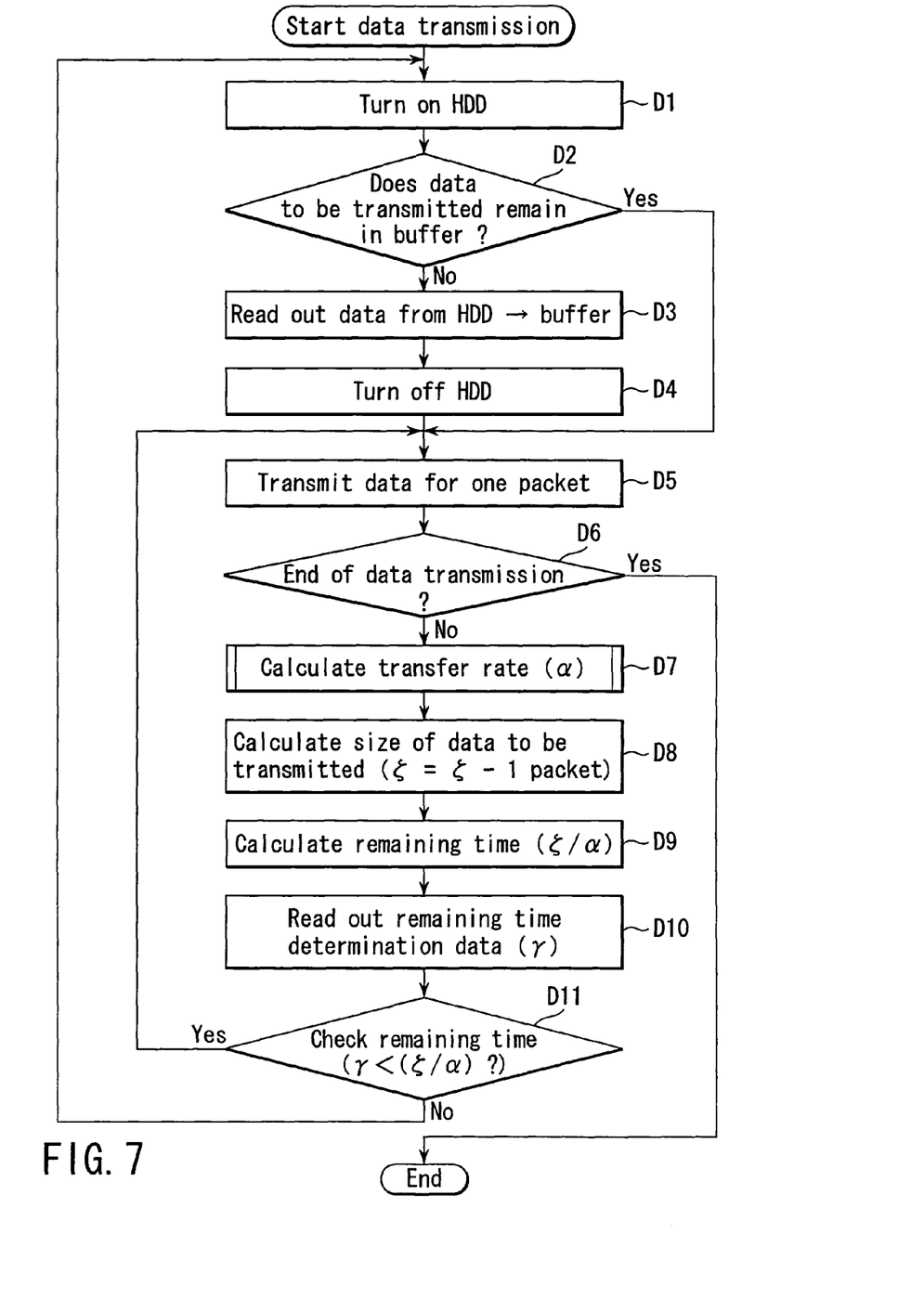
FIG. 7 is a first flowchart showing the operation sequence of HDD startup control to be executed by the HDD startup control program according to a third embodiment of the present invention.
Figure 8:
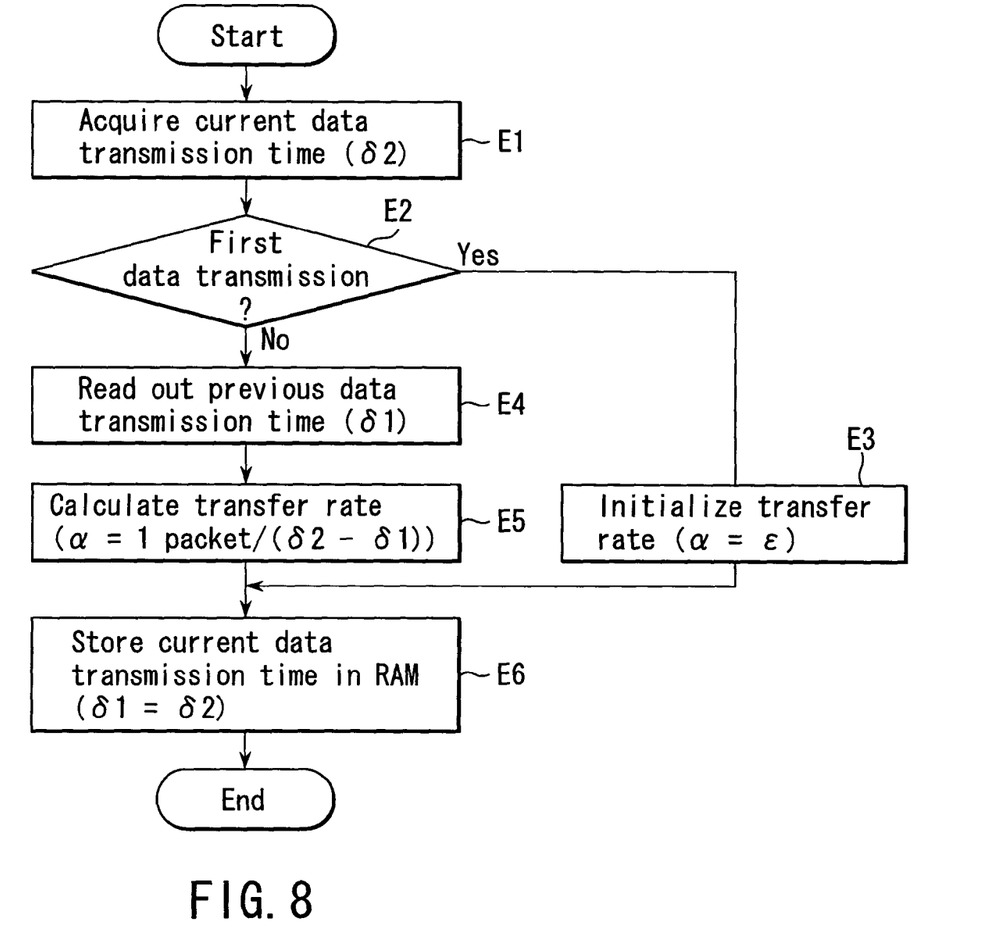
FIG. 8 is a second flowchart showing the operation sequence of HDD startup control to be executed by the HDD startup control program according to the third embodiment of the present invention.

FIGS. 7 and 8 are flowcharts showing the operation sequence of the startup control of the HDD 63, which is executed by HDD startup control program B of the third embodiment.

Upon transmitting data by the Bluetooth wireless unit 12, HDD startup control program B starts up the HDD 63 (step D1 in FIG. 7). HDD startup control program B then checks if data to be transmitted still remain in the DRAM 24 (step D2 in FIG. 7). Since this is the first process, and no data to be transmitted remains in the DRAM 24 (NO in step D2 in FIG. 7), HDD startup control program B transfers data from the HDD 63 to the buffer area of the DRAM 24 (step D3 in FIG. 7), and then stops the HDD 63 immediately after the data transfer (step D4 in FIG. 7).

After the data buffered in the DRAM 24 is transmitted (step D4), HDD startup control program B checks if data transmission is complete (step D6 in FIG. 7). If data transmission is complete (YES in step D6 in FIG. 7), this process ends; otherwise (NO in step D6 in FIG. 7), program B calculates the data transfer rate of data transmission by the Bluetooth wireless unit 12 (step D7 in FIG. 7). FIG. 8 is a flowchart showing the operation sequence of this data transfer rate calculation.

HDD startup control program B acquires the current data transmission time from the RTC 91 (step E1 in FIG. 8). Program B checks if this data transmission is the first one (step E2 in FIG. 8). If this data transmission is the first one (YES in step E2 in FIG. 8), program B sets a data transfer rate which is defined in advance (step E3 in FIG. 8). This data transfer rate is acquired from remaining time determination data A stored in the flash memory 23. HDD startup control program B stores the data transmission time acquired in step E1 in FIG. 8 in the DRAM 24 (step E6 in FIG. 8).

On the other hand, if this data transmission is not the first one (NO in step E2 in FIG. 8), HDD startup control program B reads out the previous data transmission time from the DRAM 24 (step E4 in FIG. 8), and calculates a data transfer rate on the basis of the current and previous data transmission times and data size per packet (step E5 in FIG. 8). After the data transfer rate is calculated, HDD startup control program B stores the data transmission time acquired in step E1 in FIG. 8 in the DRAM 24 (step E6 in FIG. 8).

When the data transfer rate is calculated in such a sequence, HDD startup control program B then calculates the total size of data to be transmitted which remains in the DRAM 24 (step D7 in FIG. 7). Furthermore, program B calculates the remaining time until completion of transmission of data to be transmitted, which remains in the DRAM 24, on the basis of the total size of the data to be transmitted and data transfer rate (step D9 in FIG. 7). In this case, HDD startup control program B reads out remaining time determination data A from the flash memory 23 (step E10 in FIG. 8), and checks if the calculated remaining time until completion of transmission is longer than a time indicated by remaining time determination data A (step D11 in FIG. 7).

If the calculated remaining time is longer than the time indicated by remaining time determination data A (YES in step D11 in FIG. 7), program B repeats the processes from step D6 in FIG. 7.

On the other hand, if the calculated remaining time until completion of transmission is shorter than the time indicated by remaining time determination data A (NO in step D11 in FIG. 7), HDD startup control program B returns to step D1 in FIG. 7 to restart the process so as to start up the HDD 63.

As described above, in the electronic apparatus 1 of this embodiment, the HDD 63 undergoes the startup control, so that the startup control of the HDD 63 is completed at nearly the same time that transmission of all transmission data buffered in the DRAM 24 is complete. Hence, the HDD 63 can be stopped immediately after transmission data stored in the HDD 63 is buffered in the DRAM 24, thus achieving further power savings.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable external storage apparatus capable of being driven by electric power supplied from a battery, comprising:
   a communication device performing wireless packet communication;
   a first storage device which buffers received data of the communication device;
   a second storage device which stores the received data buffered in the first storage device;
   a startup time holding unit configured to hold a startup time of the second storage device;
   a calculation unit configured to calculate a data transfer rate of the communication device based on reception time and data size of two consecutively received packets and to calculate a remaining time until the first storage device becomes full of data, on the basis of the data transfer rate of the communication device and a free capacity of the first storage device; and
   a control unit configured to start up the second storage device when the remaining time calculated by the calculation unit reaches the startup time held by the startup time holding unit.

2. The apparatus according to claim 1, wherein the control unit stops the second storage device when the received data buffered in the first storage device has been stored in the second storage device after the second storage device is started up.

3. The apparatus according to claim 1, wherein the control unit reflects an actual startup time in the startup time held by the startup time holding unit after the second storage device is started up.

4. A portable external storage apparatus capable of being driven by electric power supplied from a battery, comprising:
   a communication device performing wireless packet communication;
   a first storage device which buffers transmission data of the communication device;
   a second storage device which stores the transmission data to be buffered in the first storage device;
   a startup time holding unit configured to hold a startup time of the second storage device;
   a calculation unit configured to calculate a data transfer rate of the communication device based on transmission time and data size of two consecutively transmitted packets and to calculate a remaining time until data to be transmitted remaining in the first storage device are transmitted, on the basis of the data transfer rate of the communication device and a total capacity of the data to be transmitted which remain in the first storage device; and
   a control unit configured to start up the second storage device when the remaining time calculated by the calculation unit reaches the startup time held by the startup time holding unit.

5. The apparatus according to claim 4, wherein the control unit stops the second storage device when the data to be transmitted has been buffered in the second storage device after the second storage device is started up.

6. The apparatus according to claim 4, wherein the control unit reflects an actual startup time in the startup time held by the startup time holding unit after the second storage device is started up.

7. A startup control method of a portable external storage apparatus capable of being driven by electric power supplied from a battery and having a communication device that performs wireless packet communication, a buffer unit that buffers received data of the communication device, and a storage device that stores the received data buffered in the buffer unit, said startup control method comprising:

calculating a data transfer rate of the communication device based on reception time and data size of two consecutively received packets;

calculating a remaining time until the buffer unit becomes full of data, on the basis of the data transfer rate of the communication device and a free capacity of the buffer unit; and starting up the storage device when the remaining time reaches a predetermined time.

8. A startup control method of a portable external storage apparatus capable of being driven by electric power supplied from a battery and having a communication device that performs wireless packet communication, a buffer unit that buffers transmission data of the communication device, and a storage device that stores the transmission data to be buffered in the buffer unit, comprising:

calculating a data transfer rate of the communication device based on transmission time and data size of two consecutively transmitted packets;

calculating a remaining time until data to be transmitted remaining in the buffer unit are transmitted, on the basis of the data transfer rate of the communication device and a total capacity of the data to be transmitted which remains in the buffer unit; and starting up the storage device when the remaining time reaches a predetermined time.

* * * * *